(12) United States Patent
Martin et al.

(10) Patent No.: US 9,514,317 B2
(45) Date of Patent: Dec. 6, 2016

(54) POLICY-BASED TRUSTED INSPECTION OF RIGHTS MANAGED CONTENT

(71) Applicant: INTEL CORPORATION, Santa Clara, CA (US)

(72) Inventors: Jason Martin, Beaverton, OR (US); Matthew Hoekstra, Forest Cove, OR (US)

(73) Assignee: Intel Corporation, Santa Clara, CA (US)

(*) Notice: Subject to any disclaimer, the term of this patent is extended or adjusted under 35 U.S.C. 154(b) by 73 days.

(21) Appl. No.: 14/367,405

(22) PCT Filed: Dec. 19, 2013

(86) PCT No.: PCT/US2013/076413
§ 371 (c)(1),
(2) Date: Jun. 20, 2014

(87) PCT Pub. No.: WO2015/094261
PCT Pub. Date: Jun. 25, 2015

(65) Prior Publication Data
US 2015/0347768 A1    Dec. 3, 2015

(51) Int. Cl.
*G06F 21/62* (2013.01)
*H04L 29/06* (2006.01)
(Continued)

(52) U.S. Cl.
CPC ........... *G06F 21/62* (2013.01); *G06F 9/45558* (2013.01); *G06F 21/10* (2013.01); *G06F 21/602* (2013.01);
(Continued)

(58) Field of Classification Search
None
See application file for complete search history.

(56) References Cited

U.S. PATENT DOCUMENTS 6,663,000 B1 * 12/2003 Muttik ................. G06F 21/565
235/375
8,140,655 B1 * 3/2012 Schantz ................ G06F 9/5061
709/223
(Continued)

FOREIGN PATENT DOCUMENTS

WO   2012-082410   6/2012
WO   WO2014/196966   12/2014

OTHER PUBLICATIONS

Anati, Ittai, et al., "Innovative Technology for CPU Based Attestation and Sealing," Intel Corporation, 2013, 7 pages.
(Continued)

*Primary Examiner* — Michael R Vaughan
(74) *Attorney, Agent, or Firm* — Trop, Pruner & Hu, P.C.

(57) ABSTRACT

An embodiment includes a method executed by at least one processor comprising: initializing first and second secure enclaves each comprising a trusted software execution environment that prevents software executing outside the first and second secure enclaves from having access to software and data inside the first and second secure enclaves; the first secure enclave (a)(i) inspecting a policy, (a)(ii) authenticating the second secure enclave in response to inspecting the policy; and (a)(iii) communicating encrypted content to the second secure enclave in response to authenticating the second secure enclave; and the second secure enclave (b)(i) decrypting the encrypted content to produce decrypted content, and (b)(ii) inspecting the decrypted content. Other embodiments are described herein.

19 Claims, 8 Drawing Sheets

(51) Int. Cl.
*G06F 9/455* (2006.01)
*G06F 21/60* (2013.01)
*G06F 21/10* (2013.01)

(52) U.S. Cl.
CPC ........... *H04L 63/0428* (2013.01); *H04L 63/08* (2013.01); *H04L 63/145* (2013.01); *H04L 63/20* (2013.01); *G06F 2009/45579* (2013.01); *G06F 2009/45587* (2013.01); *G06F 2221/0724* (2013.01)

(56) References Cited

U.S. PATENT DOCUMENTS

| | | | | |
|---|---|---|---|---|
| 2006/0143700 A1* | 6/2006 | Herrmann | ........... | H04L 63/0823 726/14 |
| 2008/0077994 A1* | 3/2008 | Comlekoglu | ........... | G06F 21/53 726/27 |
| 2010/0169666 A1* | 7/2010 | Dewan | ........... | G06F 21/36 713/190 |
| 2011/0238980 A1* | 9/2011 | Kotani | ........... | G06F 8/65 713/153 |
| 2011/0314270 A1* | 12/2011 | Lifliand | ........... | H04L 63/0428 713/151 |
| 2012/0084562 A1* | 4/2012 | Farina | ........... | G06F 21/575 713/168 |
| 2012/0159184 A1* | 6/2012 | Johnson | ........... | G06F 12/1466 713/189 |
| 2012/0163589 A1* | 6/2012 | Johnson | ........... | G06F 21/10 380/30 |
| 2013/0312117 A1* | 11/2013 | Sapp, II | ........... | G06F 21/62 726/30 |
| 2014/0019745 A1* | 1/2014 | Dodgson | ........... | H04L 63/065 713/150 |
| 2014/0157404 A1* | 6/2014 | Chhabra | ........... | G06F 21/54 726/22 |
| 2014/0157410 A1* | 6/2014 | Dewan | ........... | G06F 21/64 726/23 |
| 2014/0189246 A1* | 7/2014 | Xing | ........... | G06F 21/53 711/135 |
| 2015/0013008 A1* | 1/2015 | Lukacs | ........... | G06F 21/53 726/24 |
| 2015/0033012 A1* | 1/2015 | Scarlata | ........... | H04L 9/3242 713/161 |
| 2015/0222633 A1* | 8/2015 | Smith | ........... | H04L 63/10 726/29 |

OTHER PUBLICATIONS

Hoekstra, Matthew, et al., "Using Innovative Instructions to Create Trustworthy Software Solutions," Intel Corporation, 2013, 8 pages.
McKeen, Frank, et al., "Innovative Instructions and Software Model for Isolated Execution," Intel Corporation, 2013, 8 pages.
Workshop Program, "Workshop on Hardware and Architectural Support," https://sites.google.com/site/haspworkshop2013/workshop-program, accessed Oct. 3, 2013, 3 pages.
International Searching Authority, "International Search Report of the International Searching Authority," mailed Oct. 7, 2014, in International application No. PCT/US2013/076413.

* cited by examiner

US 9,514,317 B2

POLICY-BASED TRUSTED INSPECTION OF RIGHTS MANAGED CONTENT

TECHNICAL FIELD

An embodiment addresses trusted computing.

BACKGROUND

The security of digital information has become increasingly important, particularly when the information has commercial value, is confidential, or relates to a sensitive topic. In some instances digital information may be provisioned on a client device that is infested with malware. If left unchecked, such malware may compromise the security and/or integrity of digital information on the client device. For example, malware may attempt to access and/or obtain digital information from the client itself (e.g., from the client's storage or memory), from the information distribution pathway to the client, and/or from the pathway that enables a user of the client to view or otherwise interact with the digital information. A successful malware attack on any one of those areas may compromise the security of the digital information, and may result in access and/or modification of the information by an unauthorized party.

To increase the security of digital information, enterprise rights management (ERM) and other products have been developed. In many instances ERM products are designed to protect the distribution of sensitive digital information (e.g., documents, electronic mail, and the like) by providing mechanisms for maintaining the integrity and confidentiality of the information, enforcing one or more policies that govern access to the information, and/or by enforcing a logging policy that tracks the usage of digital information on a client.

While existing ERM products are useful, they continue to face security challenges from malware, which may exploit one or more weaknesses in existing ERM products in an attempt to obtain digital information as it is provisioned, stored, and/or used on the client. Authorized users of digital information may also attempt to subvert protections imposed by ERM products, which they may view as inconvenient. Accordingly, there remains a need in the art for technologies that improve the security of digital information as it is provisioned, stored, and/or used on a client platform.

BRIEF DESCRIPTION OF THE DRAWINGS

Features and advantages of embodiments of the present invention will become apparent from the appended claims, the following detailed description of one or more example embodiments, and the corresponding figures, in which:

DETAILED DESCRIPTION

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner.

As addressed above, ERM technologies aim to promote secure computing. However, technologies such as ERM, Digital Rights Management, and encrypted software solutions create problems for anti-malware inspection techniques that leave systems vulnerable to attack. An example concerns a portable document format (PDF) (an open standard for electronic document exchange maintained by the International Organization for Standardization (ISO)) document and a "hardened" renderer for the PDF document. The renderer is "hardened" because it is protected or secured and not easily inspectable (e.g., the renderer is included within a Trusted Execution Technology (TXT) or other protected environment). A hardened renderer for rendering ERM-protected encrypted PDF documents could have a scripting vulnerability that allows it to be compromised by malware located within or coupled to the PDF document. More specifically, because the PDF document is encrypted and the PDF renderer (which includes a scripting engine for executing script of PDF documents) is hardened, anti-malware techniques cannot be used to inspect the suspect PDF document prior to the execution of the script corresponding to the PDF document. Similarly software anti-piracy efforts sometimes encrypt critical pieces of code to prevent cracking, leaving the system vulnerable if that code has weaknesses or is malicious.

Figure 1:
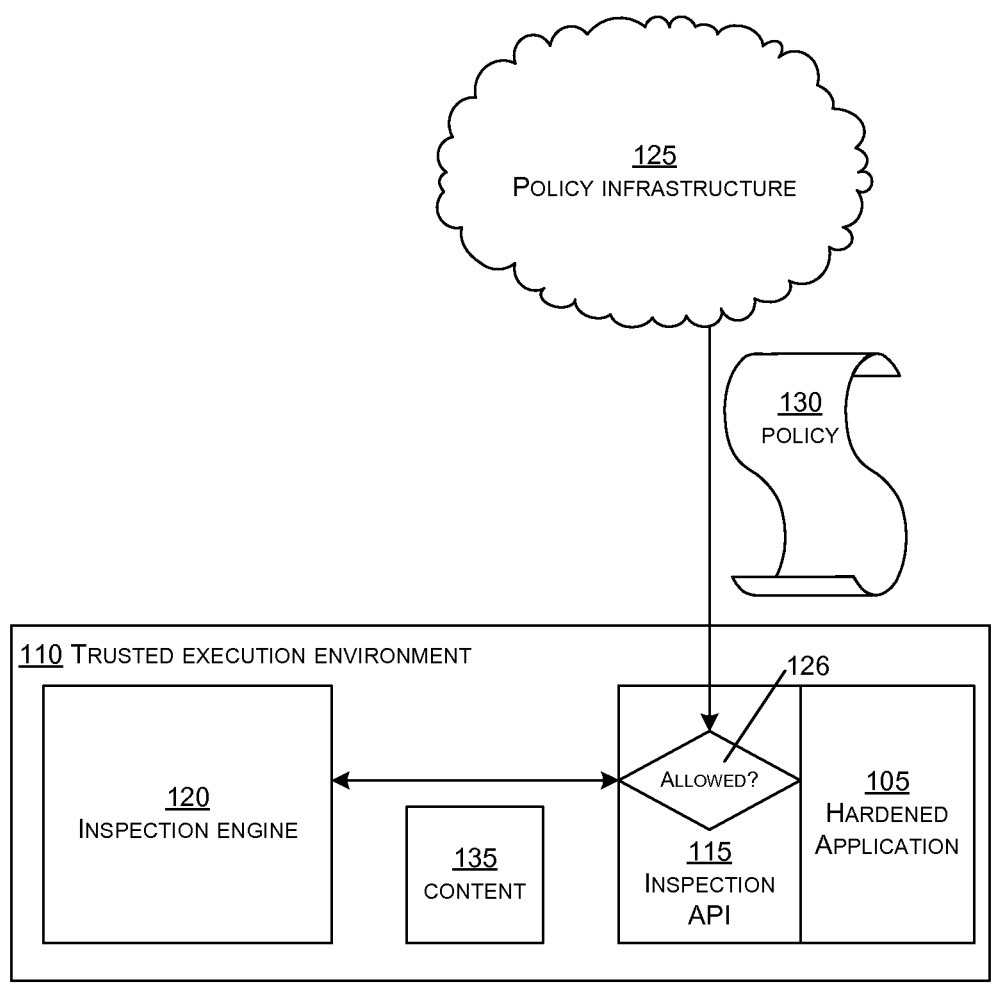
FIG. 1 depicts a secure system in an embodiment of the invention.

FIG. 1 depicts a secure system in an embodiment of the invention. The embodiment allows a hardened application 105 within a trusted execution environment 110 (such as a "secure enclave", which is discussed further below) to provide an application programming interface (API) 115 to other applications, such as an inspection engine 120 (e.g., trusted anti-virus (AV) engine) to perform inspection of encrypted content 135 (e.g., video or audio or text content such as movies, television shows, songs, books, and the like) after it has been decrypted.

An embodiment uses a policy infrastructure 125 to determine whether the inspection by the application 120 (e.g., AV engine or application or utility) should be allowed. If so, the policy 130 may further dictate what entity or entities are allowed to perform the inspection. This allows the policy 130 to be configured by the confidential content owner, such as an enterprise information technology (IT) department or a premium content distributor. For example, an IT department may insist that only AV application X may be used to examine content Y but that AV applications X or Z may be used to examine content Q.

In greater detail, an embodiment consists of four parts.

The first part includes a trusted execution environment 110 with attestation capabilities such as, without limitation, an Intel® Secure Enclave (sometime referred to as Intel® Software Guard Extensions (Intel® SGX)), Intel® Management Engine (Intel® ME), and the like. Such attestation capabilities may include, for example, the mechanism by which an enclave on one platform proves to a remote entity (or other enclave), that it was instantiated correctly.

A second part includes a hardened application 105 (e.g., a movie player, such as Windows® media player, or a document viewer, such as Adobe® Reader®, and the like) operating upon encrypted or obfuscated content 135 (e.g., video, audio, and/or text, and the like) running within the trusted execution environment 110 and containing (or coupled to) a policy enforcement engine 126 to enforce the policy 130.

A third part includes a policy infrastructure 125 (e.g., Active Directory Rights Management Services (AD RMS), Windows® Rights Management Services, Adobe® LiveCycleRights Management ES, and the like) capable of creating and delivering policy 130 to the hardened application 105.

A fourth part includes an inspection engine 120 (e.g., AV software such as McAfee® SaaS Endpoint Protection Suite that protects against viruses, spyware, web threats, hacker attacks, and the like) running within trusted execution environment 110.

While some embodiments may include all four parts other embodiments may include different combinations of only a subset of the four parts (e.g., parts 1, 2, and 4).

Figure 2:
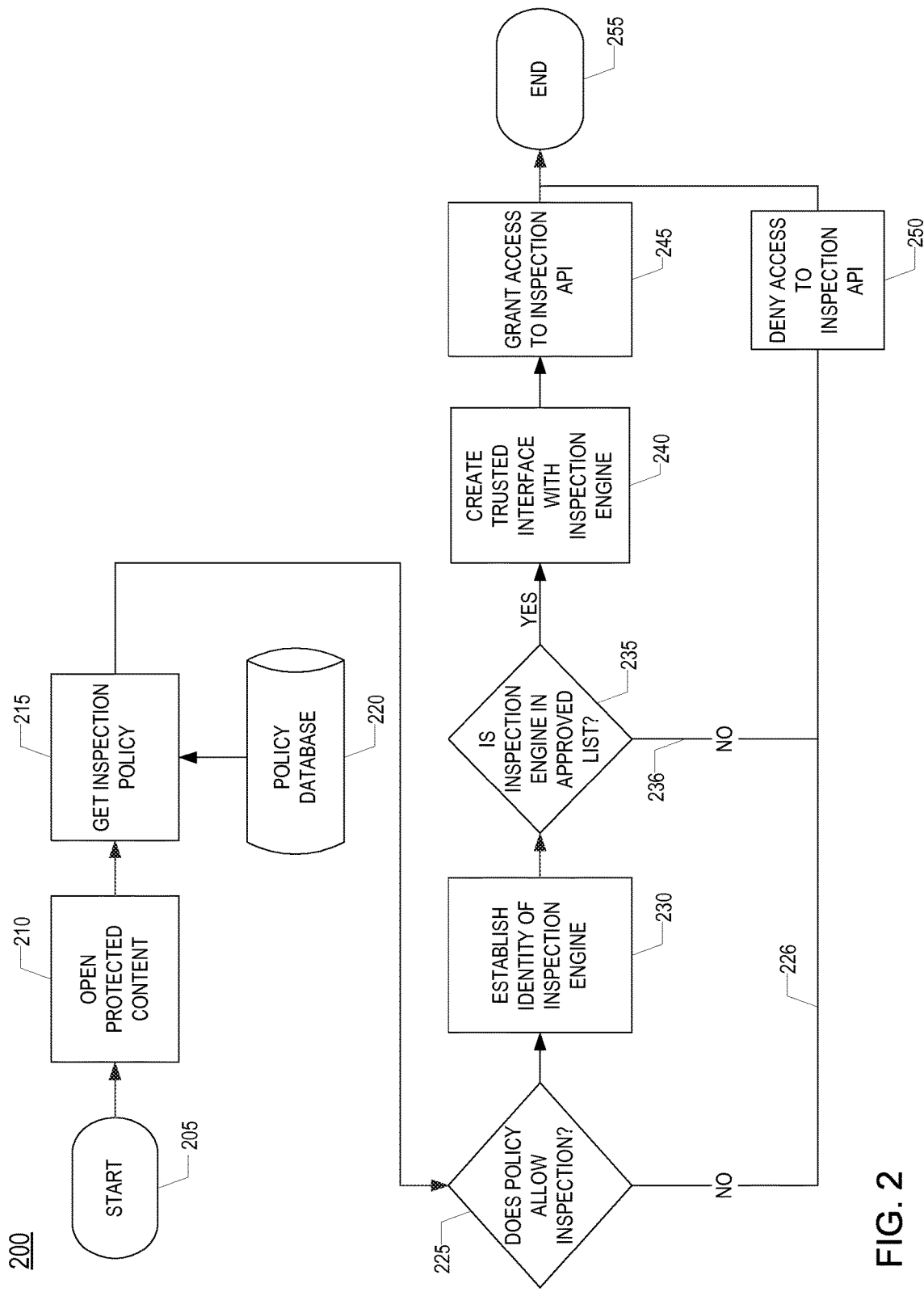
FIG. 2 illustrates a process for policy based inspection in an embodiment of the invention.

FIG. 2 illustrates a process 200 for policy based inspection in an embodiment of the invention.

In an embodiment the process 200 starts (block 205) and the hardened application opens/decrypts protected/encrypted content (block 210). Upon analysis of the content the hardened application obtains an inspection policy (block 215) that relates to the content. The policy is retrieved from policy infrastructure, such as a policy database (block 220) located on the same platform as the hardened application (or on a distantly located platform that is remote from the hardened application) and determines what inspection engines, if any, are allowed to inspect the protected content (block 225). The policy may be organizational-specific (e.g., all content can be inspected by an IT-approved anti-virus engine), content-specific (e.g., document X can be inspected by only specific inspection engine Y), and the like.

In an embodiment, if inspection of the contents is allowed a hardened application determines the identity of the inspection engine (block 230) and determines if the inspection engine is approved (block 235). If so the hardened application (105) and inspection engine (120) authenticate one another to create a trusted interface (e.g., session key protected channel) with one another (block 240). An external API is exposed (block 245) that allows inspection of the protected contents to inspection engine (120) that is allowed to perform inspection according to the policy (130). The inspection engine (or engines in some embodiments) is then able to analyze the content and make decisions accordingly, such as rejecting the content as malicious or advising that it may be potentially dangerous. The process then ends (block 255). If the policy does not allow inspection in general (226) or does not allow the particular inspection engine in question to perform inspection of the content (236) then access is denied to the inspection engine (block 250).

Thus, an embodiment allows protected contents to be fully inspected while still constraining the entities that are allowed to inspect the contents. The "constraining" is based on using a policy associated with the contents. To do so some embodiments use policy-based access to cleartext and/or unprotected contents (e.g., unencrypted video, audio, and/or text content) that are normally protected to prevent access by unauthorized agents. Such an embodiment alleviates or lessens concerns regarding malware residing within trusted execution environments, thereby providing higher value to those environments for enterprises, consumers, and the like. Such an embodiment is an improvement over conventional methods that concern, for example, inserting hook points into execution paths in a "race-to-the-bottom" style where anti-malware hooks and content protection hooks are racing to control what is or is not visible of protected content before harm can be done.

Greater details regarding certain embodiments are now addressed.

An embodiment uses a secure enclave to provide a trusted execution environment. For example, policy infrastructure 125, hardened application 105, and inspection engine 120 may be included in the same or in different trusted execution environments. A secure enclave is a trusted software execution environment which prevents software executing outside the enclave from having access to software and data inside the enclave. Any or all of elements 125, 105, 120 may be included in one or more enclaves.

Various embodiments of secure enclaves are described in, for example, the U.S. patent application entitled "Method and Apparatus to Provide Secure Application Execution", filed Nov. 13, 2009 (Ser. No. 12/590,767); the PCT Patent Application entitled "Method and Apparatus to Provide Secure Application Execution", filed Dec. 22, 2009 (Application No. PCT/US2009/069212); the U.S. patent application entitled "System and Method for Implementing a Trusted Dynamic Launch and Trusted Platform Module (TPM) Using Secure Enclaves", filed Dec. 22, 2010 (Ser. No. 12/976,831); the PCT Patent Application entitled "Technologies For Hardening The Security Of Digital Information On Client Platforms", filed Jun. 4, 2013 (Application No. PCT/US2013/44158); "Using Innovative Instructions to Create Trustworthy Solutions" (by Matthew Hoekstra et al.), "Innovative Instructions and Software Model for Isolated Execution" (by Frank Mckeen et al.), and other papers presented at The Second Workshop on Hardware and Architectural Support for Security and Privacy, In Conjunction with ISCA 40, Jun. 24, 2013 in Tel-Aviv, Israel. Consequently, details regarding operation of secure enclaves are not entirely addressed herein. These applications and papers are referred to herein collectively as the "secure enclave materials."

As described in the secure enclave materials, a secure enclave is carved out of the virtual address space of its containing process. Memory management of the enclave is performed in terms of virtual addresses. In an embodiment enclave memory management is divided into two parts: address space allocation and memory commitment. Address space allocation is the specification of a maximal range of addresses that the enclave may use. No actual resources are committed to this region. Memory commitment is the assignment of actual memory resources (as pages) within the allocated address space. This two-phase technique allows enclaves to flexibly control their memory usage and allow for growth without overusing memory resources when enclave needs are low. Commitment adds virtual pages to the enclave.

This distinction is reflected in the two instructions ECREATE and EADD. ECREATE allocates a range of addresses for use by the enclave. EADD commits virtual memory pages within that range to the enclave. An operating system may support separate allocate and commit operations. For example, the Windows API VirtualAlloc takes a flag argument of MEM_RESERVE (allocation) or MEM_COMMIT (commitment). It is not required that an OS support this separation, but its presence can make memory management within an enclave more flexible and efficient.

In one embodiment, a secure enclave is created using the ECREATE instruction, specifying a base and size of the virtual address space range in which the enclave is to be built. Memory is added to the secure enclave before it is sealed. The enclave creation and commitment process is best illustrated, for example, by using the Windows API and proceeds as follows: (1) reserve address space region in the process using VirtualAlloc, passing in the MEM_RESERVE flag (which reserves a region of memory without actually committing any physical memory or page file storage); (2) commit the first page of the enclave by calling VirtualAlloc again, this time with the MEM_COMMIT flag; (3) use the ECREATE instruction to set up the initial environment, specifying the same address range as above (i.e., ECREATE allocates a region of virtual memory within the application for hosting the secure code and data); and (4) for each additional page to be added to the enclave: VirtualAlloc the enclave page, use EADD to add the new page to the enclave, use EEXTEND to add a measurement for 128 bytes of the page (EEXTEND updates the measurement of the enclave to include the code or data added in EADD), and call this instruction until the entire enclave is measured (e.g., a measurement may include a cryptographic hash of the code and data in an enclave at the time it is initialized). If a contiguous set of enclave pages is to be added at once, the above steps can be reordered and optimized to minimize the number of system calls. On operating systems that do not support separate reserve and commit operations, the VirtualAlloc above can be replaced by a simple malloc, for example, and the remaining calls to VirtualAlloc eliminated.

Because the ECREATE and EADD instructions enable encryption and integrity for the added page, it is not possible for non-enclave software to initialize this memory after it has been added to the enclave. The runtime system must completely initialize any memory for which it is responsible before EADDing it. This typically requires the runtime system to build the enclave image in-place, even before calling ECREATE (i.e., because SECS cannot be modified by software after ECREATE). Once memory has been initialized, the enclave ECREATEd and its memory EADDed, it may be sealed and measured as described herein. Again, the inspection engine 120, hardened application 105, and/or policy infrastructure 125 may each be initialized, sealed and measured as described above.

In one embodiment, there are two data structures inside the enclave, the Secure Enclave Control Store (SECS) and the Thread Control Structure (TCS). SECS and TCS contain architectural information and non-architectural convenience fields used by the runtime software. All of the convenience fields and a few of the architectural fields are initialized by software. During enclave creation, code and data for an enclave may be loaded from a clear-text source. It is not possible to load encrypted code and/or data directly into an enclave during creation. However, code and/or data from an encrypted source may be installed into an enclave by first loading a trusted loader into the enclave. Once the enclave is running, this loader can then be used to install secret code/data (e.g., encrypted text, audio, and/or video) into the enclave.

Once the SECS, one or more TCSs, and the code and data have been EADDed, the enclave creation is completed by the EINIT instruction. This instruction stops further measurement information from being written into a measurement register (MR) (sometimes referred to in the co-pending applications as "IR0"). In other words, EINIT locks down the contents of the enclave and ensures that only the code within the enclave has access to the data regions in the same enclave. After EINIT no further pages may be added to the enclave.

Untrusted code calls into the enclave using the EENTER instruction and the enclave returns back to the untrusted caller via EEXIT. On enclave entry, control is transferred to code which switches the stack pointer to one inside the enclave. When returning the software again swaps the stack pointer then executes the EEXIT instruction.

Thus, once the enclave has been created and initialized with EINIT, attempted accesses to the enclave's memory from unauthorized software, even software such as virtual machine monitors, BIOS, or operating system functions operating at a higher privilege level than the enclave itself, are prevented. From a physical point of view, while enclave data is resident within registers, caches, or other logic blocks inside the processor package, unauthorized access via software is prevented by CPU logic. Whenever enclave data leaves the on-package caches to be written to platform memory, the data is automatically encrypted and its integrity is protected. This prevents malicious individuals from using memory probes or other techniques to view, modify, or replay data or code contained within the enclave.

The immediately preceding description discusses various mechanisms for instantiating secure enclaves. Once those enclaves are instantiated they may authenticate themselves to one another via attestation. More specifically, as each page of data (e.g., encrypted text, audio, and/or video) is loaded into the enclave, using the EADD and EEXTEND instructions, internal data structures within the CPU are updated to include cryptographic measurements of the code and data added to the enclave. The ability of a remote party to verify that enclave measurements and platform settings are configured as expected is referred to as attestation. SGX uses two related credentials for attestation: reports and quotes. A report is used to verify the correctness of enclaves on the local platform, and a quote can be used to reflect platform and enclave state to entities outside of the platform. Once the attestation has been successfully completed, a trusted channel can be established between a server and the enclave enabling secrets to be securely transmitted.

A more detailed examination of an embodiment for provisioning enclaves and then authenticating enclaves to one another is now examined.

As used herein, the term "provisioning" refers to processes by which a client establishes its identity with a server, and stores that identity and other credentials locally in a secured fashion for subsequent communication with the server. Accordingly, provisioning may be understood as an initialization step that may occur before, during, or after digital information, modules, etc. are provided on a client device.

Figure 3:
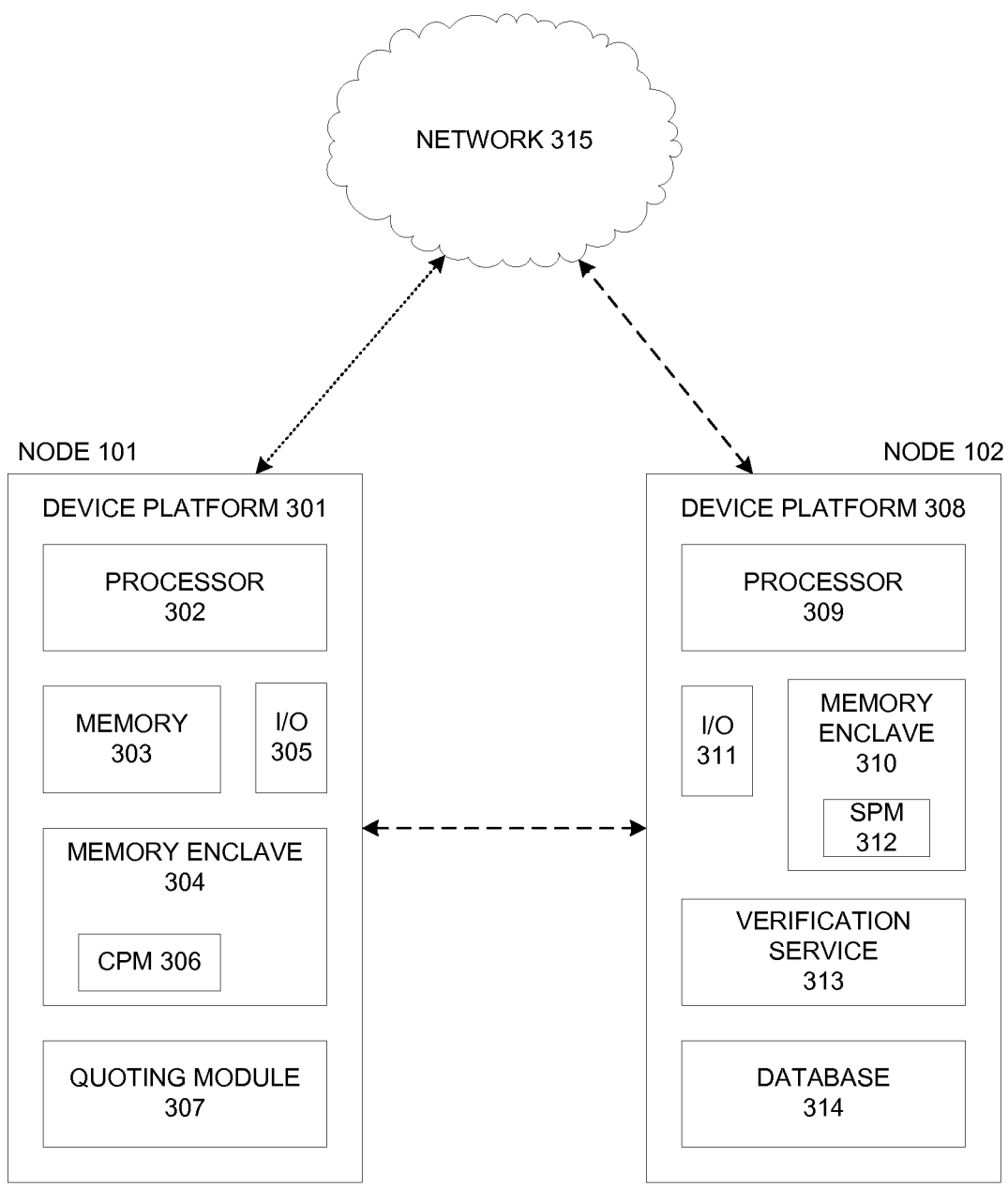
FIG. 3 illustrates a block diagram of exemplary system architecture of a client provisioning system consistent with the present disclosure.

FIG. 3 illustrates a block diagram of exemplary system architecture of a client provisioning system consistent with the present disclosure. As shown, the system includes node 101 and node 102. Node 101 and node 102 may communicate directly or indirectly using network 315, which may be a short range communications network, a long range communications network, or a combination thereof.

Node 101 and node 102 respectively include device platforms 301, 308. Without limitation, device platforms 301, 308 may correlate to one or more device types such as servers, clients, mobile computing nodes, Smartphones, tablets, laptops, notebooks, netbooks, and the like.

Node 101 and node 102 may further respectively include processors 302, 309. Such processors may be any suitable general purpose processor or application specific integrated circuit, and may be capable of executing one or multiple threads on one or multiple processor cores. Without limitation, processors 302, 309 may be general purpose processors, such as but not limited to the general purpose processors commercially available from INTEL™ Corp., ADVANCED MICRO DEVICES™, ARM™, NVIDIA™, APPLE™, and SAMSUNG™. While FIG. 3 illustrates node 101 and node 102 as each including a single processor, multiple processors may be used.

Node 101 and node 102 may also respectively include memories 303, 310, which may be any suitable type of computer readable memory. Exemplary memory types that may be used as memory 303 and memory 310 include but are not limited to: semiconductor firmware memory, programmable memory, non-volatile memory, read only memory, electrically programmable memory, random access memory, flash memory (which may include, for example NAND or NOR type memory structures), magnetic disk memory, optical disk memory, combinations thereof, and the like. Additionally or alternatively, memories 303, 310 may include other and/or later-developed types of computer-readable memory.

Node 101 may be further configured to provide enhanced security for the provisioning and storage of trusted data, code, modules and other information, including but not limited to authentication credentials. Node 101 may therefore include memory enclave 304, which may function to provide a secure environment for the storage and processing of digital information. As shown in FIG. 3 memory enclave 304 may be present in node 101 as an independent component, e.g., within an independent memory module. Alternatively or additionally, memory enclave 304 may be present within memory 303; in which case all or a portion of memory 303 may be configured as a memory enclave. While a single memory enclave 304 is shown in FIG. 3, it should be understood that node 101 may include multiple memory enclaves. For example, node 101 may include an additional memory enclave (e.g., a quoting enclave, not shown), which may be provided within memory 303 or another memory of node 101, such as a memory local to processor 302.

Node 101 and node 102 may also respectively include input/outputs (I/O) 305 and 311. I/O 305 may include hardware (i.e., circuitry), software, or a combination of hardware and software that is configured to allow node 101 to transmit and receive communications to and from node 102 and, where applicable, a distributor of digital information (e.g., distributor 103). Likewise, I/O 311 may include hardware (i.e., circuitry), software, or a combination of hardware and software that is configured to allow node 102 to send and receive communications to and from node 101 and, where applicable, a distributor of digital information. In some embodiments, I/O 305 and 311 may include one or more communications modules that enable node 101 and node 102 to communicate with one another.

Communication between I/O 305 and I/O 315 may occur over a wired or wireless connection using a close and/or long range communications network. Such communication may comply with a predefined communications protocol, such as a BLUETOOTH™ protocol, near field communication protocol, any or the wireless 802.11 communications protocols in force on or before the effective filing date of the present disclosure, or a combination thereof. I/O's 305, 311 may therefore include hardware to support such communication, e.g., one or more transponders, antennas, BLUETOOTH™ chips, personal area network chips, near field communication chips, combinations thereof, and the like.

I/O's 305, 311 may also be configured to receive information (e.g., digital information, license policies, etc.) from a data storage medium such as a magnetic recording medium, optical recording medium, magneto-optical recording medium, a solid state (FLASH) recording medium, combinations thereof, and the like. In such instances, I/O's 305, 311 may be configured to permit the receipt of diverse content via such data storage devices.

Node 101 and node 102 may further include "client" provisioning module (CPM) 306 and "server" provisioning module (SPM) 312, respectively (although this does not imply that node 101 must be a client and node 102 must be a server). CPM 306 may be stored and executed within the context of memory enclave 304 and thus protected from malware and other malicious entities that may be resident on node 101.

In an embodiment SPM 312 may be stored and/or executed in memory enclave 310, in which case SPM 312 may be protected from malware and other entities that may be resident on node 102.

CPM 306 and SPM 312 may include computer readable instructions which may be executed by processors 302 and 309 respectively, or by another processor. In the case of CPM 306, the CPM instructions may be executed within memory enclave 304. In any case, execution of CPM instructions may cause node 101 and/or node 102 to perform secure provisioning operations consistent with the present disclosure. Node 101 may also include quoting module 307, which may include computer readable instructions that when executed (e.g., by processor 302) may cause node 101 to perform enclave report verification operations and enclave quote generation operations consistent with the present disclosure. Quoting module 307 may be stored and executed within memory enclave 304, or may be stored and executed in another (quoting) enclave, as discussed below.

CPM 306 or SPM 312 may initiate a secure provisioning process between node 101 and node 102. For example, CPM 306 may be configured to cause node 101 to initiate provisioning by sending a provisioning request message to node 102. For example, node 101 may include inspection engine 120 (FIG. 1) and node 102 may include hardened application 105 (FIG. 1). The provisioning request message may be encrypted using node 102's public key if privacy of the request is desired, in which case only node 102 can decrypt the request. In any case, SPM 312 may cause node 102 to analyze the information in the provisioning request message.

Upon analyzing the provisioning request message, SPM 312 may cause node 102 to generate a reply message for transmission to node 101. The reply message may include information that may be used for anti-replay or other purposes, such as a nonce. The reply message may be signed with a digital signature, and may include information that may be analyzed by node 101 (or, more specifically, by CPM 306) to verify the authenticity of the reply message. In some embodiments, SPM 312 causes node 102 to sign the reply message with a server private key (Spriv) using a digital signature protocol. In that instance, node 101 may verify the digital signature to the reply message using a corresponding node/server public key (Spub) (the use of "S" does not suggest node 102 must be a server or any other form of node).

If node 101 can adequately verify the reply message received from node 102, CPM 306 may cause node 101 to protect information in the reply message (e.g., nonce N) by storing it in memory enclave 304. CPM 306 may also cause node 101 to generate its own nonce (M) and securely store it in memory enclave 304.

Further in response to the reply message, CPM 306 may cause node 101 to generate an asymmetric key pair, such as may be used in Rivest, Shamir, Adleman (RSA) public key encryption and/or a digital signature protocol. More specifically, CPM 306 may be configured to cause node 101 to generate an asymmetric key pair including a node/client public key (Cpub) and a client private key (Cpriv) (the use of "C" does not suggest node 102 must be a client or any other form of node), both of which may be stored in and/or sealed to memory enclave 304.

CPM 306 may also cause node 101 to generate an enclave report. The enclave report may include, for example, a hash of a user data blob (hereinafter, "userdata") that encapsulates information stored in memory enclave 304. The userdata may encapsulate nonce N (node 102 anti-replay information), nonce M (node 101 anti-replay information), and Cpub, optionally in combination with other information stored in memory enclave 304. In some embodiments userdata may encapsulate node 101's platform identification (platform ID), a user identification (user ID) of one or more users of node 101, application specific identification information (application specific ID), a security version number (SVN) of memory enclave 304, an identifier of the independent software vendor (ISV) that provisioned memory enclave 304 on node 101, combinations thereof, and the like.

CPM 306 may further cause node 101 to perform enclave quote generation operations. In this regard, CPM 306 may cause node 101 to send an enclave report to a quoting module such as quoting module 307. Without limitation, quoting module 307 is preferably stored and executed within a quoting enclave resident on memory that is local to a processor, such as processor 302. The enclave report sent to quoting module 307 may be signed with a digital signature and/or may include other information which quoting module 307 may use to verify the authenticity of the enclave report. For example, CPM 306 may cause node 101 to sign the enclave report using a suitable digital signature protocol and memory enclave 304's enclave key prior to transmitting the enclave report to quoting module 307.

Quoting module 307 may be configured to perform enclave report verification operations and enclave quote generation operations consistent with the present disclosure. For example, upon receiving an enclave quote, quoting module 307 may cause node 101 to verify the authenticity of the report. Any suitable verification methodology may be used for this purpose. For example, where the enclave report has been signed with a digital signature, quoting module 307 may cause node 101 to verify the authenticity of the digital signature using an appropriate signature verification protocol. If the signature applied to the enclave report is verified, quoting module 307 may determine that the enclave report was generated by an enclave on node 101 (e.g., memory enclave 304), and not by an unauthorized entity such as malware.

By way of example, CPM 306 may cause node 101 to sign an enclave report with an enclave key (Ekey), which may be specific to memory enclave 304. In such instances quoting module 307 may cause node 101 to verify the authenticity of the signature to the enclave report using a corresponding key, which may have been pre-provisioned to quoting module 307 or which may be derived from other information. For example, where Ekey is derived from the client processor ID and/or the hardware profile of the client, quoting module 307 may derive a key that is equivalent to Ekey from such information and compare signatures made with the equivalent key to the signature applied to the enclave report using Ekey.

Once quoting module 307 has verified the authenticity of the enclave report it may determine that the enclave report was generated by a valid enclave on node 101 (e.g., enclave 304), and not by an unauthorized entity such as malware. Quoting module 307 may then cause node 101 to generate an enclave quote. The enclave quote may include a copy of the enclave report, optionally in combination with other information. One example of other information that may be included in the enclave quote includes a key or keys that may be used by node 102 to verify digital signatures that may be applied to communications from node 101. For example, quoting module 307 may cause node 101 to generate an enclave quote that includes node 101's public key (i.e., Cpub). Further examples of other information that may be included in the enclave quote include the client's platform ID, relevant user IDs, the security version number (SVN) of enclave 304, the identity of the ISV that provided enclave 304, a measurement of enclave 304, application specific identification (ID) combinations thereof, and the like.

After an enclave quote has been generated control may return to CPM 306, which may cause node 101 to send the enclave quote to node 102. For example, CPM 306 may cause node 101 to prepare a quoting message to node 101, which may be optionally encrypted using key such as server's public key. CPM 306 may then cause node 101 to transmit the quoting message to node 102, e.g., via network 315.

In response to the quoting message, SPM 312 may cause node 102 to verify the authenticity of the enclave quote included in an enclave message received from node 101. Verification of the enclave quote may be performed in any manner. For example, SPM 312 may cause node 102 to transfer the quoting message to verification service 313, which may be local or remote to node 102, as illustrated in FIG. 3 by the hashing of box 313. Verification service 313 may verify the enclave quote using a suitable verification protocol. In instances where the enclave quote is signed with a digital signature, verification service 313 may verify the authenticity of the signature using an appropriate digital signature verification protocol. For example, the enclave quote may be signed with a private key of node 101, such as enhanced privacy identification (EPID) private key. In such a case, verification service 313 may verify the authenticity of the signature using a corresponding public key, such as an EPID public key.

If the signature applied to the enclave quote is verified, SPM 312 may cause node 102 to verify the integrity of memory enclave 304 by analyzing the enclave quote contained in the quoting message. For example, SPM 312 may cause node 102 to compare a measurement of enclave 304 in the enclave quote against a whitelist of valid enclave measurements stored in a database that is local to or remote from node 102, e.g., optional database 314. Additional information included in the enclave quote (if any) may be verified in a similar manner, e.g., by comparing the additional information to a corresponding white list of information stored in optional database 314.

If all of the verification operations successfully complete, SPM 312 may determine that memory enclave 304 on node 101 is valid and trusted. SPM 312 may then cause node 102 to generate a whitelist identity (whitelist ID) for node 101, and to store all or a portion of the content of the enclave quote in a whitelist database in association with the whitelist ID.

SPM 312 may also cause node 102 to send a message including the whitelist ID to node 101. In response to such message, CPM 306 may cause node 101 to store the whitelist ID to memory enclave 304. In particular, CPM 306 may cause node 101 to seal the whitelist ID and other client authentication credentials (e.g., client key(s), user identification, machine identification, application specific ID, etc.) to memory enclave 304, e.g. by encrypting such information with memory enclave 304's enclave key (Ekey).

The technology described herein may thus be used to provision node 101 with a whitelist ID. The whitelist ID and other secrets of node 101 (e.g., its platform ID, user ID, SVN, ISV, enclave key (Ekey), enclave measurement etc.) may be stored in and/or sealed to enclave 304 while not in use, and thus may be protected from attack by malware resident on node 101. The provisioning technology also results in the provisioning of node 102 with a client whitelist ID and other secrets (e.g. the contents of an enclave quote), which may be stored in memory that is local to or remote from node 102, such as database 314.

After provisioning, node 101 may authenticate itself to node 102 by unsealing the secrets within secure enclave 304 and sending its whitelist ID to node 102, e.g., in a signed message. Node 102 can verify the authenticity of the client by verifying the signature applied to the message and comparing the whitelist ID of the client to whitelist IDs of approved platforms. Because node 101 may unseal the secrets within memory enclave 304, the plaintext of such secrets may be protected from malware or other unauthorized entities resident on client 101. The technologies of the present disclosure may therefore protect client authentication credentials and other information as it is provisioned to a client, stored on a client, used on a client, and combinations thereof.

Figure 4:
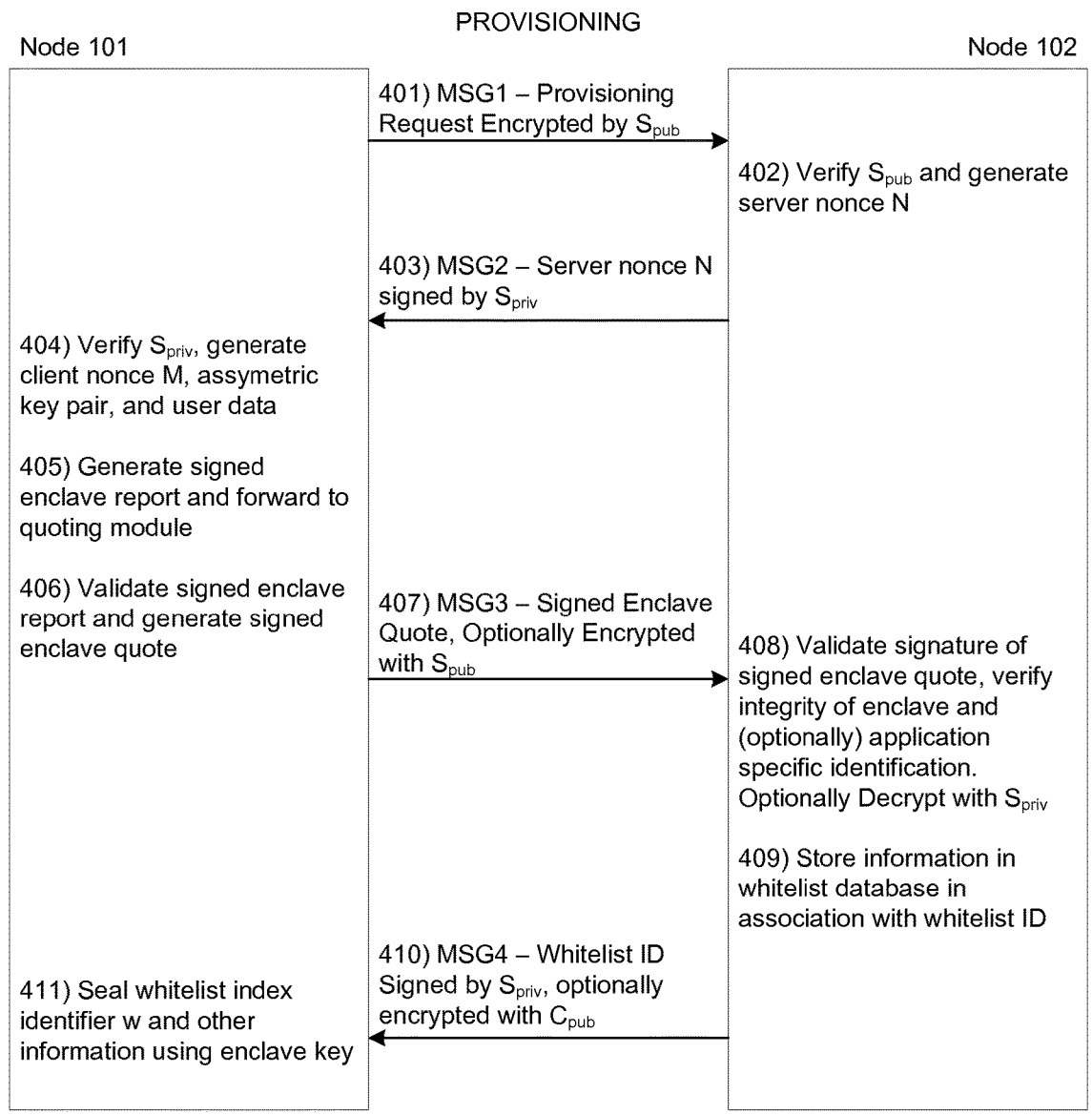
FIG. 4 illustrates a messaging flow of an exemplary provisioning method consistent with the present disclosure.

FIG. 4 illustrates a messaging flow of an exemplary provisioning method consistent with the present disclosure. For the sake of this discussion, it is assumed that node 101 and node 102 are configured as shown in FIG. 3, and that they each have a source of entropy for generating nonces, such as a random number generator. It is also assumed that a signing key pair has been generated for node 102 prior to execution of the messaging flow, with node 101 possessing a server public key (Spub) and node 102 possessing a server private key (Spriv). Spub may be stored within and/or sealed to memory enclave 304 and thus may be protected from malware that may be resident on node 101. Indeed, tampering with Spub within memory enclave 304 may produce a detectable change in the measurement of memory enclave 304, which may be considered evidence of tampering.

In this exemplary messaging flow, a user of node 101 may wish to receive digital information (e.g., software, documents, etc.) from node 102. Prior to this point however, node 102 may not trust node 101. Node 101 and node 102 may therefore execute a provisioning method to establish a root of trust and to facilitate provision initial secrets on node 101.

To begin, node 101 or node 102 may initiate provisioning. This concept is illustrated in FIG. 4, which depicts node 101 as initiating provisioning. In this case, computer readable instructions of CPM 306 when executed may, pursuant to element 401, cause node 101 to send a provisioning request (MSG1) to server 102. For security or another purpose, the provisioning request may be encrypted by node 101, e.g., using a single key encryption, symmetric key encryption, asymmetric key encryption, or the like. In some embodiments, the provisioning request is protected via an asymmetric key encryption protocol. This concept is illustrated in FIG. 4, wherein node 101 encrypts MSG1 with node 102's public key, Spub.

The method may then proceed to element 402, wherein server provisioning module (SPM) instructions of SPM 312 when executed may cause node 102 to verify the authenticity of provisioning requests it receives using any suitable verification protocol. For example, node 102 may verify a received provisioning request by attempting to decrypt the provisioning request, e.g., with its private key (i.e., Spriv). If it is able to successfully decrypt the provisioning request with Spriv, node 102 may be confident that the request originated from a client having knowledge of Spub. At this point, the SPM instructions when executed may cause node 102 to generate a server nonce (N) (server anti-replay information) using a local or remote source of entropy such as a random number generator.

The method may then proceed to element 403, wherein the SPM instructions when executed may cause node 102 to generate a provisioning response message (MSG2) including nonce N. The SPM instructions may also cause node 102 to sign MSG2 with a signing key that may be verified by node 101, e.g. node 102's private key (Spriv). Once MSG2 is signed, the SPM instructions may cause node 102 to transmit the signed MSG2 to node 101. At this point, the method may proceed to elements 404-406.

Pursuant to element 404 CPM instructions of CPM 306 when executed may cause node 101 to verify the signature applied to MSG2. In instances where node 102 signed MSG2 with Spriv for example, the CPM instructions may cause node 101 to verify the authenticity of the signature using Spub. If the verification succeeds the CPM instructions may cause node 101 to store nonce N in memory enclave 304. The CPM instructions may also cause node 101 to generate a nonce M (client anti-replay information) using a local or remote source of entropy. Like nonce N, the CPM instructions may cause node 101 to store nonce M within memory enclave 304.

The CPM instructions when executed may further cause node 101 to generate an asymmetric key pair, such as may be used in Rivest, Shamir, Adleman (RSA) public key encryption. More specifically, the CPM instructions may cause node 101 to generate an asymmetric key pair including Cpub and a corresponding private key (Cpriv), both of which may be stored in memory enclave 304.

The method may then proceed to element 405, wherein the CPM instructions when executed may cause node 101 to calculate a user data blob (userdata). The userdata may encapsulate nonce N, nonce M, Cpub, and optionally other information as discussed previously. The CPM instructions may further cause node 101 to generate an enclave report. Without limitation, the enclave report may include a hash of the userdata, either alone or in combination with other information as previously described.

The CPM instructions may then cause node 101 to sign the enclave report (including a hash of user data and optional identification information), with a signing key. In some embodiments the CPM instructions may cause node 101 to sign the enclave report using an enclave key (Ekey), which may have been pre-provisioned within memory enclave 304, e.g., at the time memory enclave 304 was established on node 101. Ekey may be specific to the hardware of node 101. That is, Ekey may correspond to or be derived from the processor ID of processor 302, a hardware profile of node 101, combinations thereof, and the like. Alternatively or additionally, Ekey may be specific to the owner of memory enclave 304, e.g., the independent software vendor (ISV) that established memory enclave 304 on node 101, in which case Ekey may be understood to be an ISV signing key.

Once a signed enclave report has been generated the method may proceed to block 406, wherein the CPM instructions may cause node 101 to validate the signed enclave and generate a signed enclave quote. In this regard the CPM instructions may cause node 101 to forward the signed enclave report to a quoting module, such as quoting module 307 of FIG. 3, which may be an independent secure enclave executed close to the processor of node 101 and may include computer readable quoting module instructions. In response to receiving the signed enclave report, the quoting module instructions may cause node 101 to verify the signature applied to the signed enclave report. For example the quoting module instructions may cause processor 302 to verify the signature applied to the signed enclave report against a signature obtained from a client platform key (Pkey) key. Pkey may be equivalent to Ekey, and may be stored within the quoting module. If the signatures are identical, the quoting module may determine that a valid secure enclave on the client generated the signed enclave report.

Once the signed enclave report is validated, the quoting module instructions may cause node 101 to generate a secure enclave quote that may include various information as discussed above. The quoting module instructions may further cause node 101 to sign the enclave quote using a signing key such as the client's EPID private key, which may have been pre-provisioned on the client. The method may then proceed to block 407, wherein the CSM instructions when executed cause node 101 to send a message (MSG3) encapsulating the signed enclave quote to node 102. As shown in FIG. 4, MSG3 may be optionally encrypted, e.g., using the node 102 public key, Spub or another key.

The method may then proceed to element 408, wherein SPM instructions when executed may cause node 102 to perform various operations on MSG3. For example if node 101 encrypted MSG3 with Spub, the SPM instructions may cause node 102 to decrypt MSG3 using a decryption protocol and Spriv. Once MSG3 is decrypted (or if MSG3 was not encrypted), the SPM instructions when executed may cause node 102 to verify the digital (e.g., EPID) signature applied to the signed secure enclave quote, using a verification service that is local to or remote from node 102. In any case, the verification service may have knowledge of one or more keys that correspond to the key used by node 101 to sign the enclave quote. For example, where the enclave quote was signed with node 101's EPID private key, the verification service may verify the authenticity of the EPID private key using a corresponding EPID public key in accordance with known EPID verification protocols.

The SPM instructions when executed may also cause node 102 to verify the integrity of memory enclave 304 on node 101. For example, the SPM instructions may cause node 102 to compare the enclave measurement included in the secure enclave quote against a whitelist of valid enclave measurements, which may be stored in a local or remote database such as database 314 of FIG. 3. If other identifying indicia (e.g., the client's machine identifier, user ID's of authorized users of node 101, application specific identification information, an independent software vendor (ISV) identifier, a security version number (SVN) of memory enclave 304, etc.) is included in the secure enclave quote, the CPM instructions may cause node 102 to verify such information as well, e.g., by comparing such information to a whitelist of identification indicia stored in database 314 or at another location.

In some instances the signed enclave quote may include a hash of userdata and a nonce (e.g., nonce N or nonce M). In those cases the SPM instructions when executed may cause node 102 to verify the userdata hash against a white list of approved userdata hashes. Moreover, the SPM instructions when executed may cause node 102 to verify the nonce, e.g., for anti-replay purposes.

The method may then proceed to element 409, wherein SPM instructions when executed may cause node 102 to store all or a portion of the information in the enclave quote/report within a local or remote memory, e.g., in optional database 314. For example, the SPM instructions may cause node 102 to store the measurement of enclave 304, client username (if included), client machine ID (if included), application specific information (if included), the hash of userdata, and the client public key (Cpub) in optional database 314 or another data structure. The SPM instructions may also cause node 102 to generate a whitelist ID for node 101, which may be stored in association with information received in the enclave quote. For example, the SPM instructions may cause node 102 to store the whitelist ID in database 314, in association with other information received from node 101.

The method may then proceed to element 410, wherein the SPM instructions may cause node 102 to send the whitelist ID to node 101. In this regard, the SPM instructions may cause node 102 to prepare a message (MSG4) including the whitelist ID, which may be optionally signed with Spriv and/or encrypted using Cpub. In any case, the SPM instructions may cause node 102 to transmit MSG4 to node 101 via wired or wireless communication, e.g., using network 315.

The method may then proceed to element 411, wherein the CPM instructions when executed may cause node 101 to verify the authenticity of MSG4. For example, where MSG4 is signed with node 102's private key (e.g., Spriv), the CPM instructions when executed may cause node 101 to verify the authenticity of the signature using a corresponding public key (e.g., Spub). Alternatively or additionally, if MSG4 is encrypted with Cpub, the CPM instructions when executed may cause node 101 to decrypt MSG4 within memory enclave 304 using a corresponding private key (e.g., Cpriv). In this way, the whitelist ID may be obtained by node 101 within memory enclave 304 and thus protected from malware. The CPM instructions may also cause node 101 to seal the whitelist ID to memory enclave 304, e.g., by encrypting the whitelist ID with memory enclave 304's enclave key.

Thus, the above describes how enclaves can be instantiated and then authenticated to one another. Below a discussion addresses policy use.

In and embodiment, document use policy and encryption keys are stored in a database on a server (e.g., policy infrastructure 125 of FIG. 1) remotely located from the platform operating any enclave that executes content (e.g., document renderer 105 of FIG. 1) and/or any enclave that includes an inspection utility such as an AV utility (e.g., utility 120 of FIG. 1). A party, such as an IT department, specifies use policy and access control using a policy engine that runs inside the enclave.

Again referring to FIG. 1, a policy is uploaded to a database (see infrastructure 125) through a secure communication channel. A protected document is encrypted within the enclave that includes hardened application 105. An authorized user 105, upon receipt of an encrypted document, can view it using the secure document reader component of the client application, running inside an enclave. The policy engine 126, after validating that the use policy (downloaded securely from the server into the enclave) of the document is compatible with the user operation (e.g., an AV utility 120 to inspect the content), also gets the document decryption key and transfers the key and control to the inspection engine 120. The inspection engine decrypts the document inside its enclave, parses the content, and generally inspects the content for malware and the like.

The code (i.e., policy engine) for enforcing the policy governing the inspection engine 126 is hosted inside an enclave that includes application 105 to prevent a code modification attacks. The enclave may or may not be the same enclave that holds the execution engine (e.g., document renderer, movie player).

Thus, the above shows how a policy may be used to determine whether content should be provided to an inspection engine 120. However, what follows describes a mechanism for how an enclave including application 105 can communicate with an enclave including engine 120.

Figure 5:
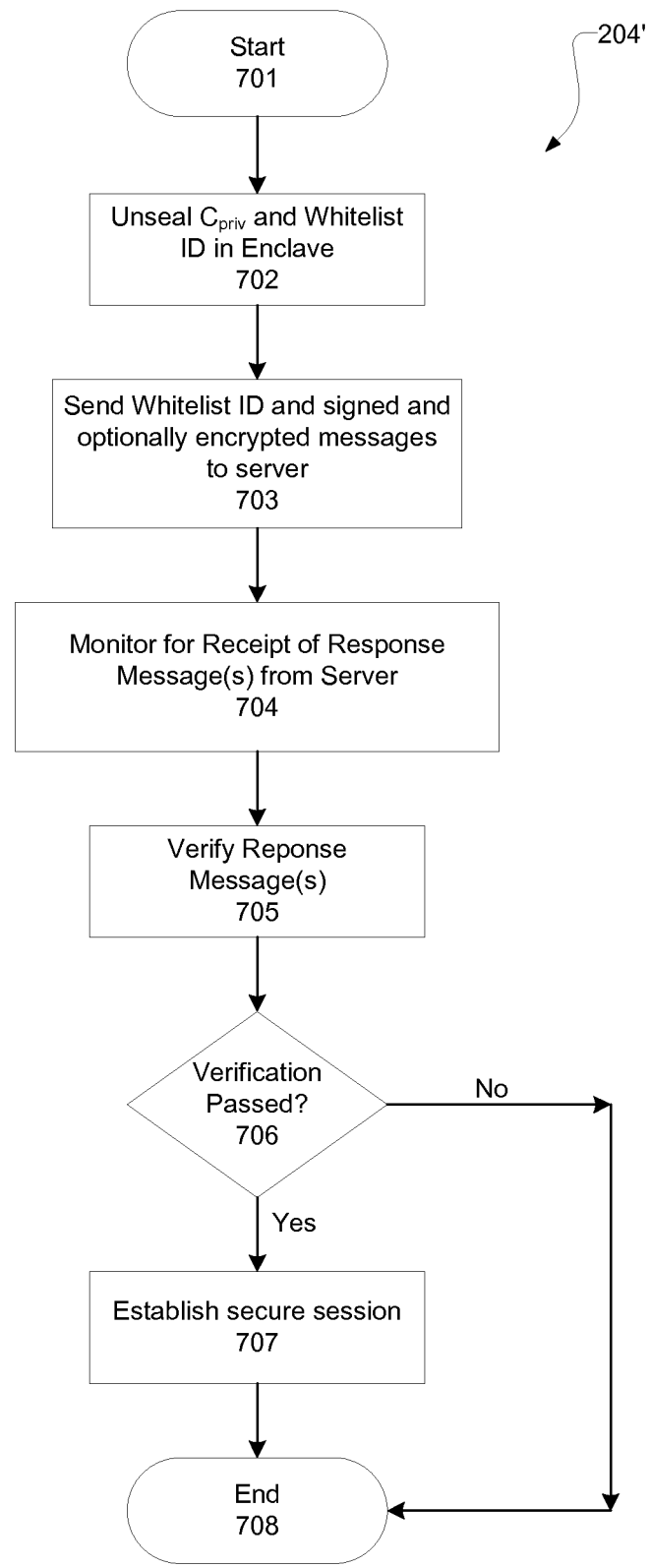
FIG. 5 is a flow diagram of exemplary client operations that may be performed in accordance with a client provisioning method consistent with the present disclosure.

FIG. 5 is a flow diagram of exemplary client operations that may be performed in connection with the establishment of a secure communications channel (session) between two nodes. For the sake of discussion, it is assumed that the nodes are configured as shown in FIG. 3. It is further assumed that the client and server have been provisioned with secrets as discussed above with regards to FIG. 4, and that secrets provisioned to a node are sealed to the node's memory enclave (e.g., memory enclave 304). Although not expressly discussed, it should also be understood that operations performed in connection with FIG. 5 may be caused by the execution of a secure session establishment module (SSEM) on a client device, which may be independent from or included in a client provisioning module (CPM) or a client enterprise rights enforcement module (CEREM) that may be resident on a node 101.

As shown, the method begins at block 701. At block 702, node 101 may unseal private key (Cpriv), its white list ID, and optionally public key (Spub) from its memory enclave using its enclave key (Ekey). Without limitation, node 101 preferably unseals these items within its memory enclave, such that their plaintext is protected from malware.

Once Cpriv, the white list ID and optionally Spub are unsealed, the method may proceed to block 703, wherein node 101 may generate one or more authentication request messages. The authentication request message(s) may encapsulate the whitelist ID and optionally other information that may be used to authenticate node 101. For example, the information request message may include a measurement of node 101's memory enclave, the SVN of the client's memory enclave, etc. In any case, node 101 may sign the authentication request message using Cpriv, and may optionally encrypt the request message using Spub. In some embodiments, the node's whitelist ID may be included as plaintext in the authentication request message, whereas other portions of the message may be signed and optionally encrypted as previously described. In any case, node 101 may then send the signed, optionally encrypted authentication request message to node 102.

As will be described later in connection with FIG. 6, node 102 may perform authentication and validation operations on authentication request messages received from node 101. Once server 102 successfully verifies the authenticity of the authentication request messages, it may examine the content of such messages to determine if the content therein is valid. If the content is valid, node 102 may generate and send a response message to node 101, which may be optionally encrypted with the public key (Cpub) and optionally signed using the private key (Spriv).

Returning to FIG. 5, node 101 pursuant to block 704 may monitor for the receipt of response messages from node 102. Although not shown in FIG. 7, if a response message from node 102 is not received (or is not received within a pre-allocated time limit), the method may proceed to block 708 and end. If a response message is received the method may proceed to block 705, wherein node 101 may perform verification operations on the received response message. For example, node 101 may attempt to decrypt the response message using Cpriv if the response message was encrypted by node 102 using Cpub. If such decryption is successful, node 101 may be confident that the response message originated from a party with knowledge of Cpub, i.e., node 102.

To further verify the authenticity of the response message (s), node 101 may validate the digital signature applied to such messages by node 102. For example if node 102 signed a response message using its private key (e.g., Spriv), node 101 may verify the signature using a corresponding public key (e.g., Spub) using known signature verification protocols. For this purpose, node 101 may at this time unseal Spub within its enclave, if Spub was not previously unsealed.

The method may then proceed to block 706, wherein a determination may be made as to whether the response message was successfully validated. If validation of the response message is unsuccessful, the method may proceed to block 708 and end. If validation of the response message was successful the method may proceed to block 707, wherein node 101 may establish a secure session (communications channel) with node 102. In some embodiments, node 101 and node 102 may establish a secure session in which they encrypt messages to one another using their respective public keys. That is, node 102 may encrypt messages to client 101 using Cpub, and client 101 may encrypt messages to server 102 using Spub. Node 101 and node 102 may decrypt those encrypted messages using their corresponding private keys, i.e., Cpriv and Spriv. In this way, node 101 and node 102 may securely communicate and exchange information using their corresponding public and private keys.

Alternative or additionally, node 101 and node 102 may negotiate a secure session based on the use of a shared session key (SSK). By way of example, upon their mutual authentication node 101 and node 102 may execute a sign and message authentication code (SIGMA) protocol or another suitable protocol for establishing an SSK. In any case, the SSK may be ephemeral or permanent. If ephemeral the SSK may remain valid for a set number (e.g., 1, 2, etc.) of sessions or for a set time period, after which a new SSK may be needed. In any case node 101 and node 102 may use the SSK to encrypt messages to one another while the secure session is active. Because they each have knowledge of the SSK, node 101 may decrypt messages encrypted with the SSK from node 102, and vice versa. In this way, node 101 and node 102 may securely exchange messages using the shared session key. After the secure session has been established, the method may proceed to block 708 and end.

Although the use of a SIGMA protocol to generate and use an SSK is one suitable mechanism for establishing a secure session, other mechanisms may also be used and are envisioned by the present disclosure. Indeed, any suitable cryptographic protocol may be used for establishing a secure communications session between a client and a server consistent with the present disclosure.

Once a secure session has been established, node 101 may send information request messages to node 102. Such messages may be optionally signed and optionally encrypted using an SSK or the public key, Spub. Node 102 may optionally verify and decrypt such messages, and transmit the requested information to node 101. This capability may be of particular use in the enterprise rights management context. Indeed, node 101 may use the secure session to securely transmit requests for digital information (e.g., content such as movies, songs, and text), licenses to digital information, etc. to node 102, and node 102 can use the secure session to provide the requested content in response messages encrypted in accordance with the secure session. Likewise, node 102 may use the secure channel to securely distribute modules, software, etc., to node 101.

Figure 6:
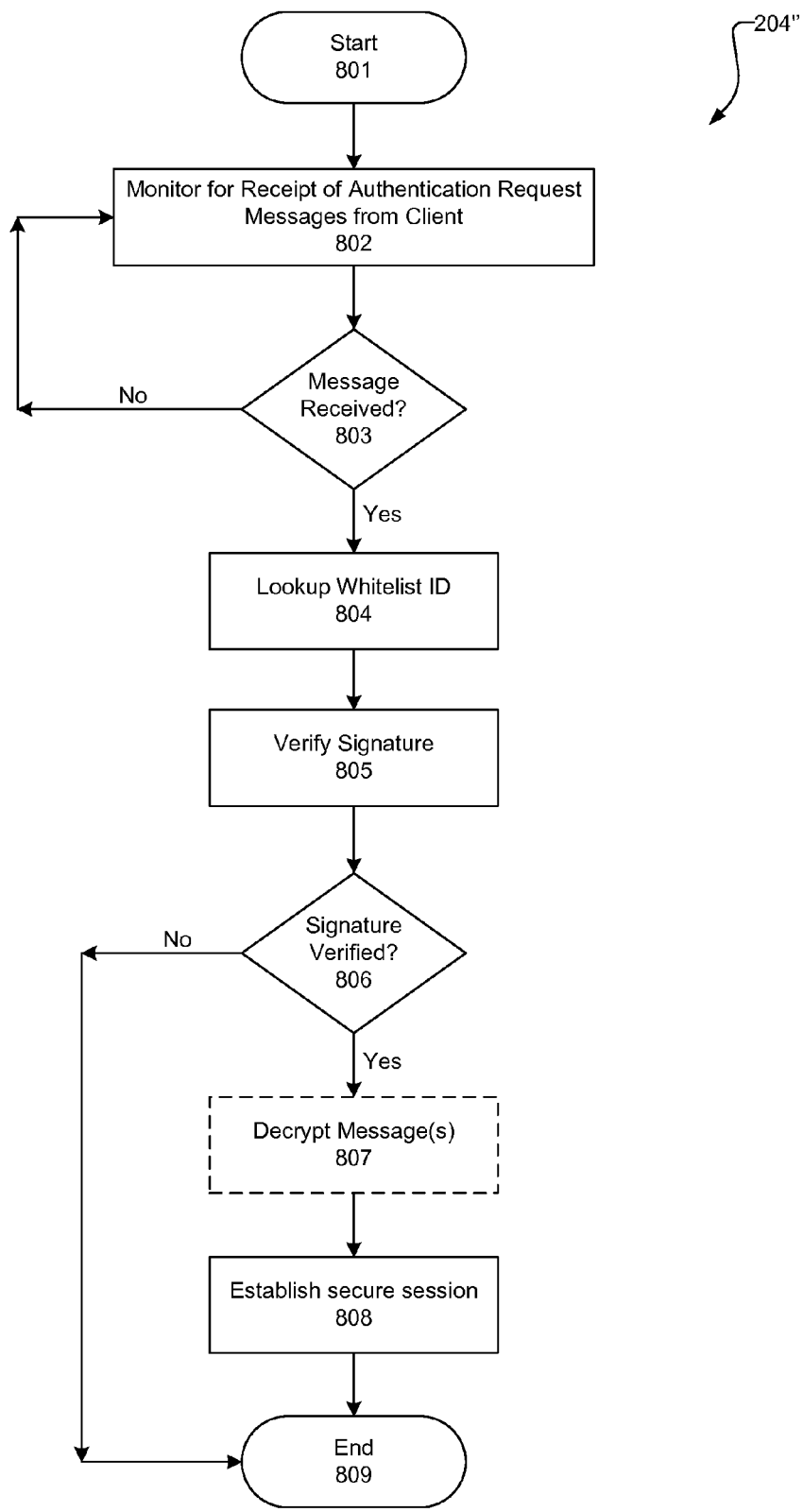
FIG. 6 is a flow diagram of exemplary server operations that may be performed in accordance with a client provisioning method consistent with the present disclosure.

Reference is now made to FIG. 6, which is a flow diagram of node 102 operations that may be performed in connection with an exemplary secure information transfer method consistent with the present disclosure. Although not expressly described, it should be understood that operations performed pursuant to FIG. 6 may be caused by the execution of one or more modules on a node, such as SPM 312 or a server enterprise rights management module (SERMM).

As shown, the method begins at block 801. At block 802, the node may monitor for receipt of an authentication request message from node 101. The method may then proceed to block 803, wherein a determination may be made as to whether an information request message has been received. If not, the method may loop back to block 802 and repeat. If an authentication request message has been received however, the method may continue to block 804.

As noted previously an authentication request message may include node 101's whitelist ID, as well as a digital signature. Pursuant to block 804, node 102 may verify the whitelist ID in the information request message against a database of pre-approved whitelist ID's, which may be stored locally or remotely from node 102, e.g., in database 314 of FIG. 3.

If the whitelist ID in the information request message matches a pre-approved whitelist ID, the method may proceed to block 805, wherein node 102 may validate the digital signature applied to the authentication request message. For example, in instances where an authentication request message is signed with node 101's private key (e.g., Cpriv, an EPID private key, etc.), node 102 may validate the signature using a corresponding public key (e.g., Cpub, an EPID public key, etc.), which may have been stored in association with the pre-approved whitelist ID, e.g., in database 314 of node 102.

The method may then proceed to block 806, wherein a determination may be made as to whether the signature was successfully verified. If not, the method may proceed to block 809 and end. If the signature is successfully verified, the method may proceed to optional block 807, wherein node 102 may decrypt the information request message, if necessary. It is again noted that node 101 may encrypt all or a portion of the information request message using the server's public key, Spub, in which case node 101 may decrypt such messages using its private key, Spriv.

Once decryption is complete (or if the information request message was not encrypted) the method may proceed to block 808. Pursuant to this block node 102 may negotiate a secure communications session with node 101, e.g., using a negotiated SSK and/or node 101 and node 102's public and private keys, as previously described. Without limitation, node 102 and node 101 preferably negotiate an ephemeral SSK, which may then be used to encrypt all messages between node 101 and node 102 while the secure communication session is active. The method may then proceed to block 809 and end.

Thus, the above describes embodiments for instantiating enclaves, authenticating enclaves, and communicating between enclaves. What follows are descriptions of embodiments for utilizing elements of these capabilities.

Figure 7:
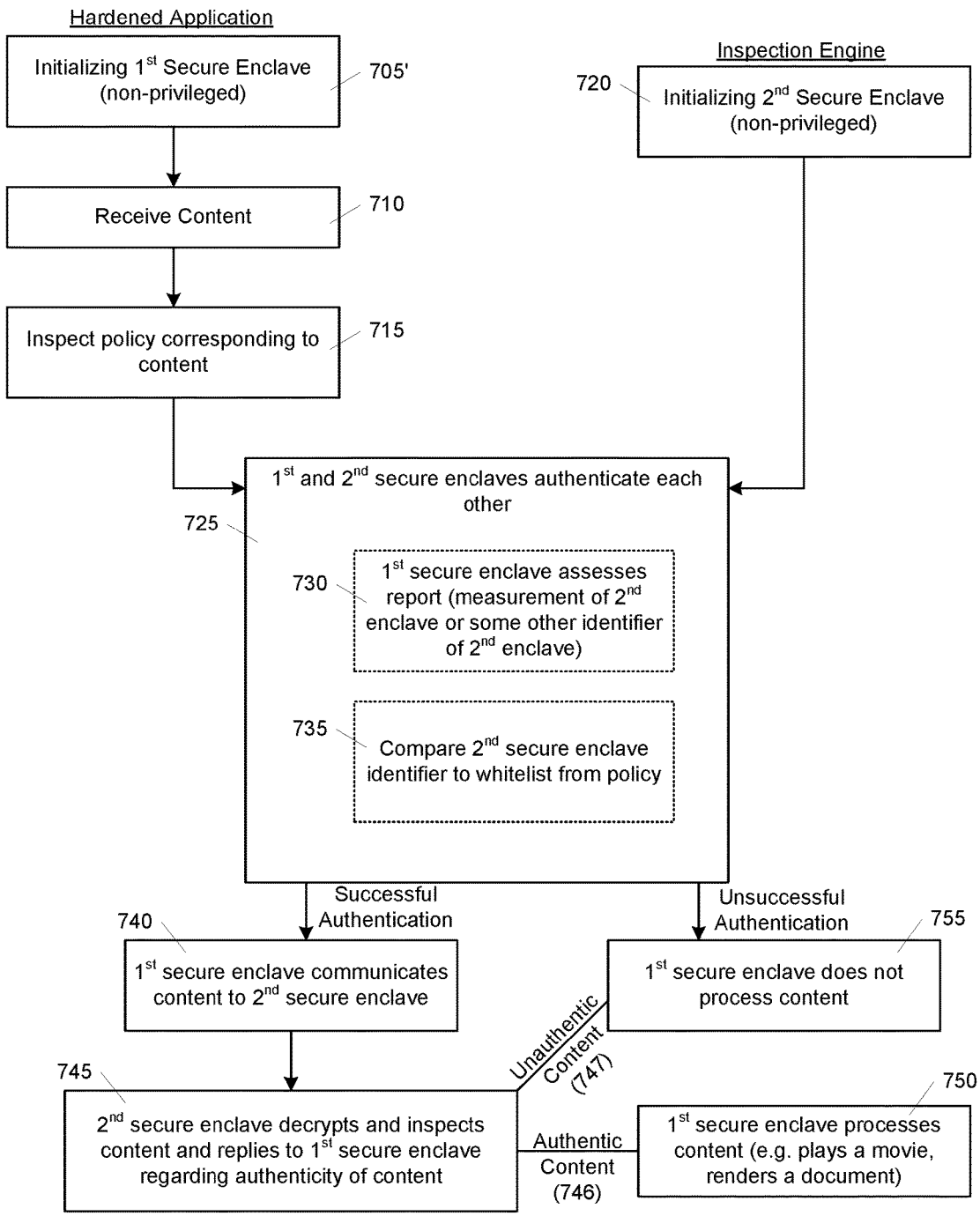
FIG. 7 is a flow diagram of exemplary client operations that may be performed in connection with the establishment of a secure communications channel (session) between a client and server consistent with the present disclosure.

FIG. 7 includes a process 700 for secure computing in an embodiment of the invention. Process 700 includes initializing (e.g., instantiating) a first secure enclave (block 705') and a second secure enclave (block 720) each comprising a trusted software execution environment that prevents software executing outside the first and second secure enclaves from having access to software and data inside the first and second secure enclaves. The first secure enclave includes an isolated memory region within an application's virtual address space (e.g., a PDF rendering application, media player, and the like) and only code executing within the first secure enclave can access data (e.g., digital content such video, audio, text, and the like) located in the first secure enclave. The second secure enclave may include an isolated memory region within an application's virtual address space (e.g., an inspection engine such as malware detection utility (also referred to herein as an AV utility and which generally includes code that determines whether content is objectionable for any reasons such as unrecognized measurement, the presence of a malware signature, and the like) and only code executing within the second secure enclave can access data (e.g., digital content such video, audio, text, and the like) located in the second secure enclave.

Other embodiments may include a single secure enclave that, for example, includes a hardened document renderer while an inspection engine is not necessarily included in a trusted computing environment such as a secure enclave.

Further, neither of the first and second secure enclaves is necessarily privileged (although either or both may be privileged in other embodiments). Thus, the applications included in the secure enclaves can process content (e.g., play a movie or inspect a movie) while at least one of an operating system, virtual machine monitor, and binary input/output system (BIOS) operating on the platform that includes one of the enclaves includes malware more privileged than the first secure enclave. Such malware may be more privileged than the first secure enclave by nature of the malware being present in the operating system and therefore being privileged.

In block 710 the first secure enclave receives content and block 715 inspects a policy corresponding to the content. These blocks do not necessarily have to occur in this order and may occur independently of one another. The policy may pertain to which inspection engines, if any, may have access to the content received by the first secure enclave. In other embodiments the whitelist may correspond more generally to other utilities (regardless of whether the utilities focus on secure computing) that may access the content.

Block 725 includes the first secure enclave authenticating the second secure enclave. This may be in response to inspecting the policy (block 75) but that is not necessarily the case in other embodiments. Block 725 does not necessarily demand that the first enclave authenticate itself to the second enclave or vice versa. More essential is that first secure enclave appreciate "who" the second enclave is in order to later vet the second secure enclave as including an application that may examine the content in question (e.g., a song). Authenticate (sometimes referred to herein as attestation) may include various optional elements. For example, authentication may include the second secure enclave communicating a report to the first secure enclave, the report (block 730) being based on at least one of (a) an identifier that is specific to at least one a computing platform including the second secure enclave, an independent software vendor (ISV) (e.g., a key or signature corresponding to the ISV), and a portion of the at least one processor (e.g., based on register settings in a processor for the platform that includes the second secure enclave), (b) a nonce generated by the computing platform, and (c) a measurement based on contents included in the second secure enclave. Regarding authentication, various identifiers were discussed in regards to FIG. 4 including, but not limited to, a blob of user information, nonces for nodes 101, 102, signed enclave reports, signed enclave quotes, and the like.

Authentication may further include the policy including a whitelist (block 735) listing an authorized inspection engine included in the second secure enclave. For example, once the first secure node understands "who" the second secure enclave is the identification (or some derivation thereof) may be compared to the whitelist to determine if the application of the second secure node should inspect the contents. Thus, an embodiment may have a first secure enclave that recognizes the second secure enclave as a trustworthy enclave but still does not "authenticate" the second enclave because the second enclave is not on the whitelist. Thus, if successful the first secure enclave authenticates the second secure enclave "in response to" inspecting the policy.

Block 740 includes the first secure node communicating encrypted content to the second secure enclave in response to authenticating the second secure enclave. Block 745 includes the second secure enclave decrypting the encrypted content to produce decrypted content, and inspecting the decrypted content. Based on this analysis or inspection the second secure enclave authenticates the decrypted content (i.e., determines whether the content is objectionable for any reasons such as unrecognized measurement, the presence of a malware signature, and the like) in response to inspecting the decrypted content; and communicating a message (746, 747) to the first secure enclave in response to authenticating the decrypted content. A message indicating authenticity (746) leads to block 750 where the first secure enclave decrypts the encrypted content to produce additional decrypted content and processes the additional decrypted content (e.g., renders a document, plays a song, plays a television show) in response to receiving the message from the second secure enclave. However, a message indicating unauthenticity/lack of authenticity (747) leads to block 755 (as does unsuccessful authentication in block 725) including disallowing the first secure enclave from processing the unencrypted content, derived from the encrypted content, in response to the second secure enclave inspecting the decrypted content.

Embodiments of the invention are not limited to a system including both first and second secure enclaves. For example, an embodiment is present in the instructions pertaining to the first secure enclave itself. For example, an embodiment includes a method executed by at least one processor comprising: initializing a first secure enclave comprising a trusted software execution environment that prevents software executing outside the first secure enclave from having access to software and data inside the first secure enclave; and the first secure enclave: receiving content and inspecting a policy; determining whether a malware detection utility may inspect the content based on inspecting the policy; authenticating the malware detection utility; communicating an encrypted version of the content to the malware detection utility in response to malware detection utility; receiving a message from the malware detection utility indicating the content is authenticated; and executing the content in response to receiving the message. While this embodiment may interact with a second secure enclave that second secure enclave is not required to fulfill or instantiate the embodiment.

The various enclaves may be included on a single platform (e.g., a tablet) along with a database including a policy. However, those items may be dispersed among various nodes. For example, the policy may be included in a cloud based server and an inspection engine may be included on another cloud based server with the hardened rendering engine present on a Smartphone or more generally, a mobile computing node.

An embodiment may include an apparatus comprising: at least one memory; at least one processor, coupled to the memory, to perform operations comprising: initializing a first secure enclave comprising a trusted software execution environment that prevents software executing outside the first secure enclave from having access to software and data inside the first secure enclave; and the first secure enclave: receiving content and inspecting a policy; determining whether an inspection engine module may inspect the content based on inspecting the policy; authenticating the inspection engine module; communicating an encrypted version of the content to the inspection engine module in response to malware detection utility; receiving a message from the inspection engine module indicating the content is authenticated; and executing the content in response to receiving the message. The memory may include memory secured by a secure enclave such as memory 304 or 310 of FIG. 3. The processor may include processors 302, 309 and the like.

Again referencing FIG. 3, FIG. 3 depicts embodiments of hardware bases systems for operating embodiments. Either of nodes 101, 102 may utilize a system such as the system of FIG. 8, discussed below. In fact, embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as (a) a computer program product that may include one or more machine readable media having stored thereon instructions that may be used to program a processing system or other electronic device to perform the methods or (b) at least one storage medium having instructions stored thereon for causing a system to perform the methods. The term "machine readable medium" or "storage medium" used herein shall include any medium that is capable of storing or encoding a sequence of instructions (transitory media, including signals, or non-transitory media) for execution by the machine and that cause the machine to perform any one of the methods described herein. The term "machine readable medium" or "storage medium" shall accordingly include, but not be limited to, memories such as solid-state memories, optical and magnetic disks, read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, as well as more exotic mediums such as machine-accessible biological state preserving or signal preserving storage. A medium may include any mechanism for storing, transmitting, or receiving information in a form readable by a machine, and the medium may include a medium through which the program code may pass, such as antennas, optical fibers, communications interfaces, etc. Program code may be transmitted in the form of packets, serial data, parallel data, etc., and may be used in a compressed or encrypted format. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

Figure 8:
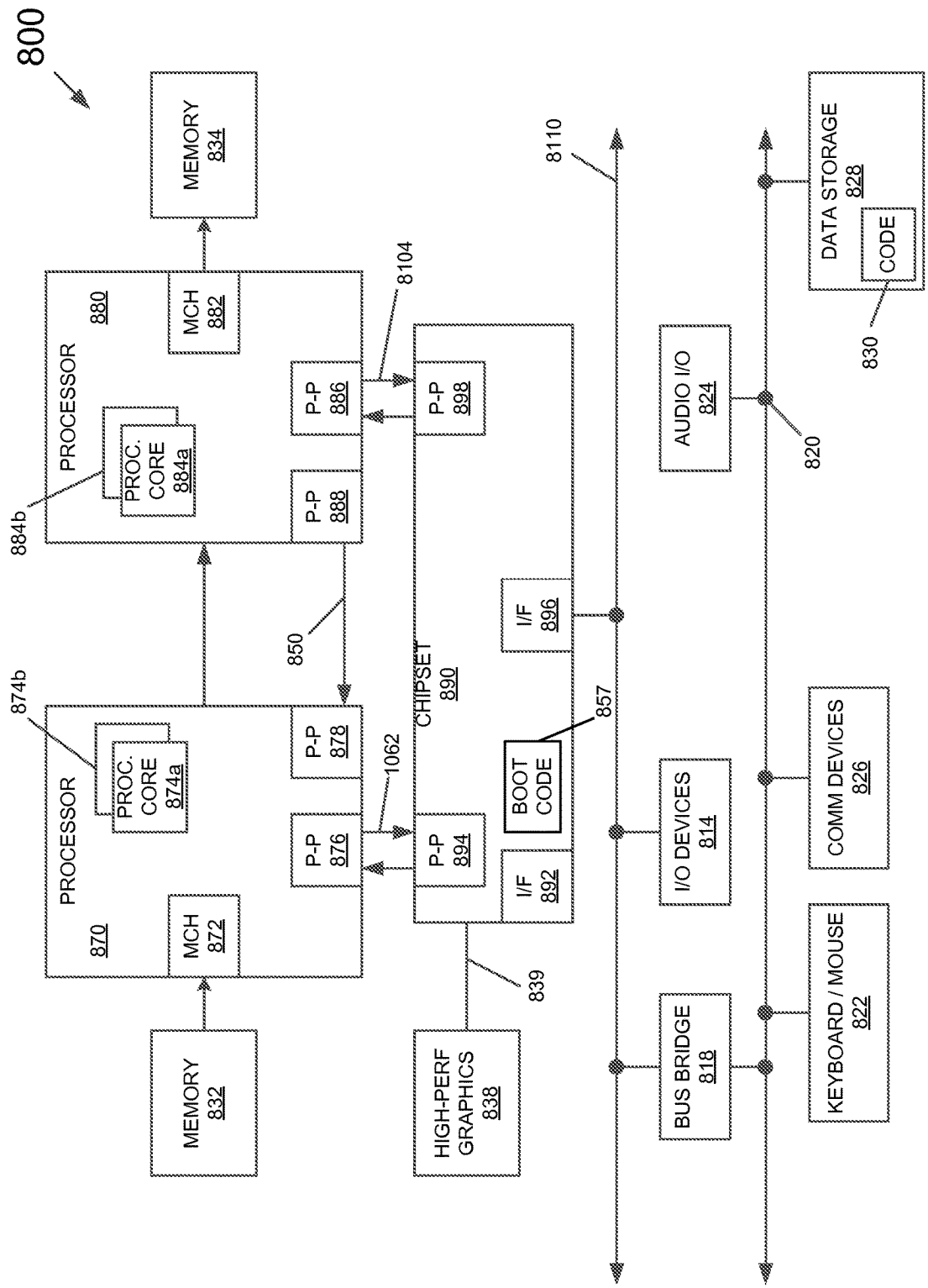
FIG. 8 includes a system for use with an embodiment of the invention.

Referring now to FIG. 8, shown is a block diagram of a system embodiment 1000 in accordance with an embodiment of the present invention. System 1000 may be included in, for example, a mobile computing node such as a cellular phone, smartphone, tablet, Ultrabook®, notebook, laptop, personal digital assistant, and mobile processor based platform.

Shown is a multiprocessor system 1000 that includes a first processing element 1070 and a second processing element 1080. While two processing elements 1070 and 1080 are shown, it is to be understood that an embodiment of system 1000 may also include only one such processing element. System 1000 is illustrated as a point-to-point interconnect system, wherein the first processing element 1070 and second processing element 1080 are coupled via a point-to-point interconnect 1050. It should be understood that any or all of the interconnects illustrated may be implemented as a multi-drop bus rather than point-to-point interconnect. As shown, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to methods discussed herein.

Each processing element 1070, 1080 may include at least one shared cache. The shared cache may store data (e.g., instructions) that are utilized by one or more components of the processor, such as the cores 1074a, 1074b and 1084a, 1084b, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the present invention is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. MC's 1072 and 1082 couple the processors to respective memories, namely a memory 1032 and a memory 1034, which may be portions of main memory locally attached to the respective processors. While MC logic 1072 and 1082 is illustrated as integrated into the processing elements 1070, 1080, for alternative embodiments the MC logic may be discrete logic outside the processing elements 1070, 1080 rather than integrated therein.

First processing element 1070 and second processing element 1080 may be coupled to an I/O subsystem 1090 via P-P interfaces 1076, 1086 via P-P interconnects 1062, 10104, respectively. As shown, I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, a bus may be used to couple graphics engine 1038 to I/O subsystem 1090. Alternately, a point-to-point interconnect 1039 may couple these components.

In turn, I/O subsystem 1090 may be coupled to a first bus 10110 via an interface 1096. In one embodiment, first bus 10110 may be a Peripheral Component Interconnect (PCI) bus, or a bus such as a PCI Express bus or another third generation I/O interconnect bus, although the scope of the present invention is not so limited.

As shown, various I/O devices 1014, 1024 may be coupled to first bus 10110, along with a bus bridge 1018 which may couple first bus 10110 to a second bus 1020. In one embodiment, second bus 1020 may be a low pin count (LPC) bus. Various devices may be coupled to second bus 1020 including, for example, a keyboard/mouse 1022, communication device(s) 1026 (which may in turn be in communication with a computer network), and a data storage unit 1028 such as a disk drive or other mass storage device which may include code 1030, in one embodiment. The code 1030 may include instructions for performing embodiments of one or more of the methods described above. Further, an audio I/O 1024 may be coupled to second bus 1020.

Various components of system 1000, such as components 1070, 1080, 1032, 1034, 1038, 1090, may include the RDL lines described herein.

Note that other embodiments are contemplated. For example, instead of the point-to-point architecture shown, a system may implement a multi-drop bus or another such communication topology. Also, the elements of FIG. 8 may alternatively be partitioned using more or fewer integrated chips than shown in the FIG. 8.

Also, while a secure enclave has at times been compared to Intel® Secure Enclave (sometime referred to as Intel® Software Guard Extensions (Intel® SGX)), a "secure enclave" is a form of trusted software execution environment and as used herein and in the claims more generally refers to isolated memory regions for an application and only code processing within the secure enclaves can access data respectively located in the secure enclave.

Example 1 includes a method executed by at least one processor comprising: initializing first and second secure enclaves each comprising a trusted software execution environment that prevents software executing outside the first and second secure enclaves from having access to software and data inside the first and second secure enclaves; the first secure enclave (a)(i) inspecting a policy, (a)(ii) authenticating the second secure enclave in response to inspecting the policy; and (a)(iii) communicating encrypted content to the second secure enclave in response to authenticating the second secure enclave; and the second secure enclave (b)(i) decrypting the encrypted content to produce decrypted content, and (b)(ii) inspecting the decrypted content.

In example 2 the subject matter of Example 1 can optionally include wherein the policy includes a whitelist listing an authorized inspection engine included in the second secure enclave.

In example 3 the subject matter of Examples 1-2 can optionally include wherein authenticating the second secure enclave includes analyzing a measurement of contents included in the second secure enclave.

In example 4 the subject matter of Examples 1-3 can optionally include wherein the second secure enclave contents include a malware detection utility.

In example 5 the subject matter of Examples 1-4 can optionally include the second secure enclave: authenticating the decrypted content in response to inspecting the decrypted content; and communicating a message to the first secure enclave in response to authenticating the decrypted content.

In example 6 the subject matter of Examples 1-5 can optionally include the first secure enclave decrypting the encrypted content to produce additional decrypted content and processing the additional decrypted content in response to receiving the message from the second secure enclave.

In example 7 the subject matter of Examples 1-6 can optionally include wherein the first secure enclave is not privileged, the method further comprising processing the additional decrypted content while at least one of an operating system, virtual machine monitor, and binary input/output system (BIOS) includes malware more privileged than the first secure enclave.

In example 8 the subject matter of Examples 1-7 can optionally include wherein the first secure enclave is not privileged.

In example 9 the subject matter of Examples 1-8 can optionally include disallowing the first secure enclave from processing unencrypted content, derived from the encrypted content, in response to the second secure enclave inspecting the decrypted content.

In example 10 the subject matter of Examples 1-9 can optionally include wherein the first secure enclave includes an isolated memory region within an application's virtual address space and only code processing within the first secure enclave can access data located in the first secure enclave.

In example 11 the subject matter of Examples 1-10 can optionally include wherein the encrypted content includes at least one of video and audio content.

In example 12 the subject matter of Examples 1-11 can optionally include wherein authenticating the second secure enclave includes the second secure enclave communicating a report to the first secure enclave, the report being based on at least one of (a) an identifier that is specific to at least one of a computing platform including the second secure node, an independent software vendor (ISV), and a portion of the at least one processor, (b) a nonce generated by the computing platform, and (c) a measurement based on contents included in the second secure enclave.

An embodiment includes at least one machine readable medium comprising a plurality of instructions that in response to being executed on a computing device, cause the computing device to carry out a method according to any one of examples 1 to 12. An embodiment includes means for performing any one of operations from examples 1 to 12. An embodiment includes a communications device arranged to carry out a method according to any one of examples 1 to 12.

Example 13 includes a method executed by at least one processor comprising: initializing a first secure enclave comprising a trusted software execution environment that prevents software executing outside the first secure enclave from having access to software and data inside the first secure enclave; and the first secure enclave: receiving content and inspecting a rights management policy; determining whether a malware detection utility may inspect the content based on inspecting the policy; authenticating the malware detection utility; communicating an encrypted version of the content to the malware detection utility in response to authenticating the malware detection utility; receiving a message from the malware detection utility indicating the content is authenticated; and processing the content in response to receiving the message.

In example 14 the subject matter of Example 13 can optionally include wherein authenticating the malware detection utility includes analyzing a measurement of at least a portion of the malware detection utility.

In example 15 the subject matter of Examples 13-14 can optionally include processing the content while at least one of an operating system, virtual machine monitor, and binary input/output system (BIOS) corresponding to the at least one processor includes malware more privileged than the first secure enclave.

In example 16 the subject matter of Examples 13-15 can optionally include wherein the first secure enclave is not privileged.

In example 17 the subject matter of Examples 13-16 can optionally include wherein the first secure enclave includes an isolated memory region within an application's virtual address space and only code executing within the first secure enclave can access the content located in the first secure enclave.

An embodiment includes at least one machine readable medium comprising a plurality of instructions that in response to being executed on a computing device, cause the computing device to carry out a method according to any one of claims 13 to 17.

Example 18 includes an apparatus comprising: at least one memory; at least one processor, coupled to the memory, to perform operations comprising: initializing a first trusted software execution environment that prevents software executing outside the first trusted software execution environment from having access to software and data inside the first trusted software execution environment; and the first trusted software execution environment: receiving content and inspecting a policy; determining whether an inspection engine module may inspect the content based on inspecting the policy; authenticating the inspection engine module; communicating an encrypted version of the content to the inspection engine module in response to authenticating the malware detection utility; receiving a message from the inspection engine module indicating the content is authenticated; and processing the content in response to receiving the message.

In example 19 the subject matter of Example 18 can optionally include wherein the operations comprise processing the content while at least one of an operating system, virtual machine monitor, and binary input/output system (BIOS) of the apparatus includes malware more privileged than the first trusted software execution environment.

In example 20 the subject matter of Examples 18-19 can optionally include wherein the first trusted software execution environment includes a first secure enclave that is not privileged.

In example 21 the subject matter of Examples 19-20 can optionally include wherein the first secure enclave includes an isolated memory region, of the at least one memory, within an application's virtual address space and only code executing within the first secure enclave can access data located in the first secure enclave.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory storage medium having instructions stored thereon for causing a system to perform operations comprising:
    initializing first and second secure enclaves each comprising a trusted software execution environment that prevents software executing outside the first and second secure enclaves from having access to additional software and data while the additional software and the data are inside the first and second secure enclaves;
    the first secure enclave (a)(i) inspecting a policy, (a)(ii) authenticating the second secure enclave in response to inspecting the policy; and (a)(iii) communicating encrypted content to the second secure enclave in response to authenticating the second secure enclave; and
    the second secure enclave, which includes a malware detection utility, (b)(i) decrypting the encrypted content to produce decrypted content, (b)(ii) inspecting the decrypted content with the malware detection utility, (b)(iii) authenticating the decrypted content in response to inspecting the decrypted content with the malware detection utility; and (b)(iv) communicating a message to the first secure enclave in response to authenticating the decrypted content.

2. The at least one medium of claim 1, wherein the policy includes a whitelist listing the malware detection utility.

3. The at least one medium of claim 1 wherein authenticating the second secure enclave includes analyzing a measurement of contents included in the second secure enclave.

4. The at least one medium of claim 1 the operations comprising the first secure enclave decrypting the encrypted content to produce additional decrypted content and processing the additional decrypted content in response to receiving the message from the second secure enclave.

5. The at least one medium of claim 4 wherein the first secure enclave is not privileged, the operations further comprising processing the additional decrypted content while at least one of an operating system, virtual machine monitor, and binary input/output system (BIOS) includes malware more privileged than the first secure enclave.

6. The at least one medium of claim 1 wherein the first secure enclave is not privileged.

7. The at least one medium of claim 1 the operations comprising disallowing the first secure enclave from processing unencrypted content, derived from the encrypted content, in response to the second secure enclave inspecting the decrypted content.

8. The at least one medium of claim 1 wherein the first secure enclave includes an isolated memory region within an application's virtual address space and only code processing within the first secure enclave can access data located in the first secure enclave.

9. The at least one medium of claim 8, wherein the encrypted content includes at least one of video and audio content.

10. The at least one medium of claim 1, wherein authenticating the second secure enclave includes the second secure enclave communicating a report to the first secure enclave, the report being based on at least one of (a) an identifier that is specific to at least one of a computing platform including the second secure node, an independent software vendor (ISV), and a portion of the at least one processor, (b) a nonce generated by the computing platform, and (c) a measurement based on contents included in the second secure enclave.

11. At least one non-transitory storage medium having instructions stored thereon for causing a system to perform operations comprising:
    initializing a first secure enclave comprising a trusted software execution environment that prevents software executing outside the first secure enclave from having access to additional software and data while the additional software and the data are inside the first secure enclave; and
    the first secure enclave:
        receiving content and inspecting a rights management policy;
        determining whether a malware detection utility may inspect the content based on inspecting the policy;
        authenticating the malware detection utility;
        communicating an encrypted version of the content to the malware detection utility in response to authenticating the malware detection utility;
        receiving a message from the malware detection utility indicating the content is authenticated; and
        processing the content in response to receiving the message.

12. The at least one medium of claim 11 wherein authenticating the malware detection utility includes analyzing a measurement of at least a portion of the malware detection utility.

13. The at least one medium of claim 11 the operations comprising processing the content while at least one of an operating system, virtual machine monitor, and binary input/output system (BIOS) corresponding to the at least one processor includes malware more privileged than the first secure enclave.

14. The at least one medium of claim 13 wherein the first secure enclave is not privileged.

15. The at least one medium of claim 11 wherein the first secure enclave includes an isolated memory region within an application's virtual address space and only code executing within the first secure enclave can access the content located in the first secure enclave.

16. An apparatus comprising:
at least one memory;
at least one processor, coupled to the memory, to perform operations comprising:
  initializing a first trusted software execution environment that prevents software executing outside the first trusted software execution environment from having access to additional software and data while the additional software and the data are inside the first trusted software execution environment; and
  the first trusted software execution environment:
    receiving content and inspecting a policy;
    determining whether an inspection engine module may inspect the content based on inspecting the policy;
    authenticating the inspection engine module;
    communicating an encrypted version of the content to the inspection engine module in response to authenticating the inspection engine module;
    receiving a message from the inspection engine module indicating the content is authenticated; and
    processing the content in response to receiving the message.

17. The apparatus of claim 16, wherein the operations comprise processing the content while at least one of an operating system, virtual machine monitor, and binary input/output system (BIOS) of the apparatus includes malware more privileged than the first trusted software execution environment.

18. The apparatus of claim 17 wherein the first trusted software execution environment includes a first secure enclave that is not privileged.

19. The apparatus of claim 18 wherein the first secure enclave includes an isolated memory region, of the at least one memory, within an application's virtual address space and only code executing within the first secure enclave can access data located in the first secure enclave.

* * * * *